United States Patent [19]

Koivunen

[11] Patent Number: 4,485,903
[45] Date of Patent: Dec. 4, 1984

[54] CENTRIFUGAL ACTUATED FRICTION CLUTCH WITH A HYDRAULIC APPLY PISTON

[75] Inventor: Erkki A. Koivunen, Livonia, Mich.
[73] Assignee: General Motors Corporation, Detroit, Mich.
[21] Appl. No.: 381,434
[22] Filed: May 24, 1982
[51] Int. Cl.³ ............................................ F16D 25/063
[52] U.S. Cl. .................................... 192/86; 192/103 FA
[58] Field of Search .............. 192/3.31, 85 A, 85 AA, 192/85 F, 86, 101, 103 F, 103 FA, 105 F, 105 A, 91 A, 3.3

[56] References Cited

U.S. PATENT DOCUMENTS

| | | | |
|---|---|---|---|
| 2,711,749 | 6/1955 | Hettinger | 192/103 FA |
| 2,876,743 | 3/1959 | Maki | 192/85 AA |
| 3,295,646 | 1/1967 | Peterson | 192/85 F |
| 4,091,899 | 5/1978 | Stevenson | 192/103 FA |

Primary Examiner—George H. Krizmanich
Assistant Examiner—Manley M.
Attorney, Agent, or Firm—Donald F. Scherer

[57] ABSTRACT

A friction clutch has an apply piston slidably disposed in a clutch housing and cooperating therewith to form an apply chamber and a feed chamber. The effective area of the apply chamber is greater than the effective area of the feed chamber. Pressurized fluid for clutch engagement is distributed directly to the feed chamber and from there through a restricted passage to the apply chamber. Fluid pressure in the feed chamber is established by a variable regulator valve and operates on the effective area of the piston to urge disengagement of the clutch. Fluid pressure in the apply chamber is established by a pair of centrifugal exhaust control valves having individual speed-pressure relationships. The fluid pressure in the apply chamber acts on the effective area thereof and urges engagement of the clutch. The pressure level in the feed chamber controls the minimum speed of engagement which can be varied by varying the feed pressure. The clutch can be designed to engage at one speed and disengage at another speed by changing the feed pressure level after clutch engagement.

3 Claims, 4 Drawing Figures

CENTRIFUGAL ACTUATED FRICTION CLUTCH WITH A HYDRAULIC APPLY PISTON

This invention relates to friction clutches and more particularly to friction clutches responsive to centrifugal controls.

In most prior art centrifugally controlled hydraulically applied clutches, the minimum engagement speed is controlled by a centrifugal ball valve or by a valve operated on by a rotating flyweight as balanced by a clutch return spring. The torque capacity of the clutch then follows a speed pressure relationship which is determined by the engagement valve in one or more additional centrifugally responsive valves. These clutches are operated at the same engagement speed and along the same speed-torque relationship curve during the entire time of clutch engagement which cannot be changed in their mode of operation to accommodate various operating conditions.

The present invention provides a hydraulically applied centrifugally controlled clutch which includes a plurality of centrifugally responsive valves to determine the engagement pressure available within the clutch apply chamber. However, the present invention also includes a feed chamber which is connected to a variable pressure source and has an effective operating area disposed on the clutch piston which urges clutch disengagement.

The fluid which operates in the apply chamber must pass through the feed chamber and a restriction prior to reaching the apply chamber. Since the fluid in the apply chamber is exhausted through the centrifugal valves, the apply pressure involves a feed and bleed function which is always maintained at a level equal to or less than the pressure level of the feed chamber. At zero or low input speeds, the clutch is disengaged by pressure in the feed chamber and substantially no pressure is generated within the apply chamber. The minimum pressure level in the apply chamber is, of course, determined by the minimum pressure setting of the centrifugal valves. As clutch input speed increases, the restriction provided by the centrifugal exhaust control valves will increase and therefore the clutch apply pressure will increase. The apply pressure chamber has a greater effective area than the feed chamber such that a lower pressure in the apply chamber can overcome the disengaging force created in the feed pressure chamber. This differential area concept is important in establishing the minimum engagement speeds and can be designed to be compatible with various prime movers. The feed pressure level can be varied within a given system to also affect the minimum clutch engagement speed.

It is therefore an object of this invention to provide an improved centrifugally controlled pressure applied friction clutch wherein a feed chamber and an apply chamber are formed on a differential area piston such that fluid pressure in the feed chamber urges disengagement of the clutch while fluid pressure in the apply chamber, as established by centrifugal exhaust control valves, urges engagement of the clutch.

It is another object of this invention to provide an improved centrifugally sensitive clutch wherein a clutch housing and a differential area apply piston cooperate to form a feed chamber which is pressurized to urge disengagement and an apply chamber, which is larger in effective area than the feed chamber and is supplied fluid therefrom through a restriction, is operable to urge disengagement of the clutch and wherein a pair of centrifugally responsive valve members control the exhausting of fluid from the apply chamber to thereby establish the fluid pressure within the apply chamber.

It is a further object of this invention to provide a centrifugally sensitive clutch having a feed chamber which is supplied fluid pressure to urge disengagement and an apply chamber which is supplied fluid pressure from the feed chamber through a restricted flow passage to urge clutch engagement and wherein the pressure level within the feed chamber is controlled by a selectively operable variable pressure regulator and the pressure level in the apply chamber is controlled by a plurality of centrifugally controlled exhaust valves.

These and other objects and advantages of the present invention will be more apparent from the following description and drawings in which.

Figure 1:
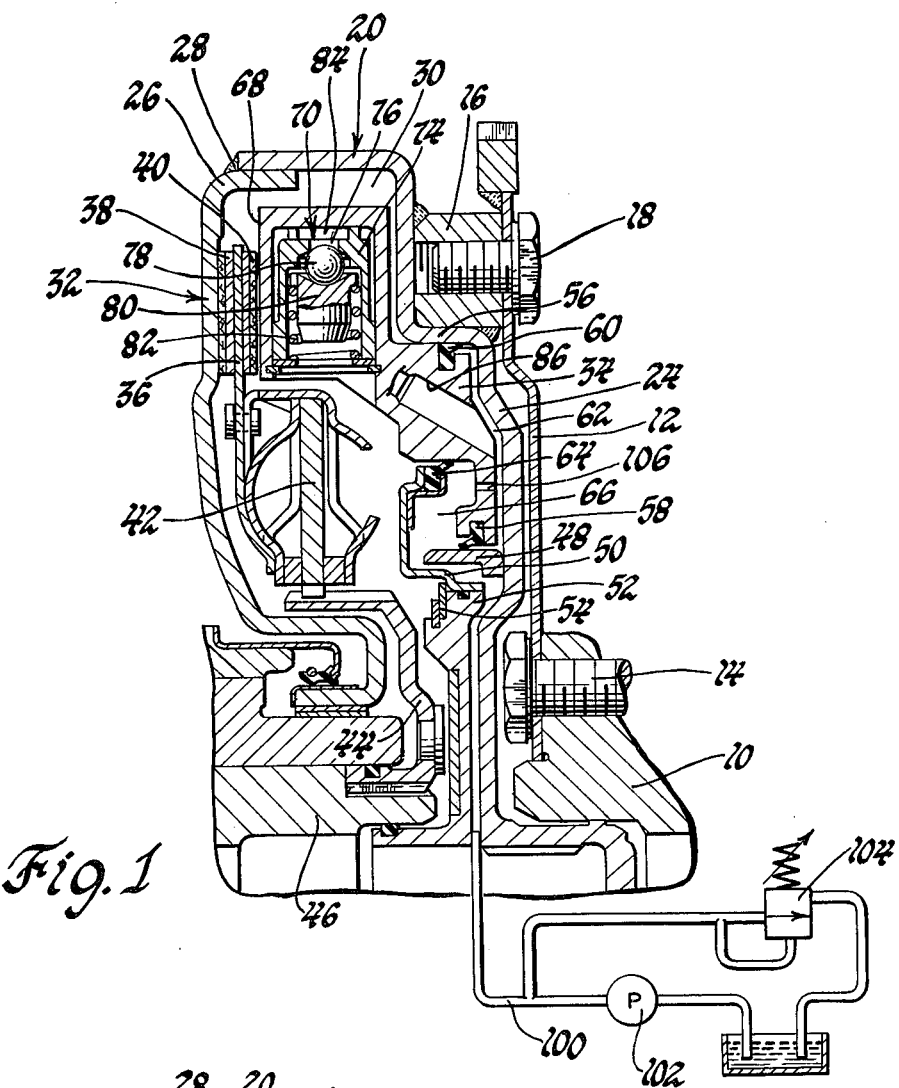
FIG. 1 is a cross-sectional elevational view of a friction clutch and a diagrammatic representation of a hydraulic supply circuit.

Referring to the drawings, there is seen in FIG. 1 an engine crankshaft 10 which is a component in a conventional internal combustion engine and is drivingly connected to a flex plate 12 by a plurality of fasteners 14. The flex plate 12 is secured to a plurality of lugs such as 16 by fasteners 18.

The lug 16 is secured to a clutch housing 20. The clutch housing 20 includes a pair of annular sheet metal members 24 and 26 which are secured together at 28 to form an annular or toroidal space 30 in which is disposed a friction clutch 32 and an apply piston 34. The friction clutch 32 includes a plate member 36 having annular friction faces 38 and 40 bonded thereto. The plate member 36 is connected through a torsional vibration damper 42 to a clutch hub 44 which in turn is splined to a clutch output shaft 46.

The clutch housing 20 also includes an annular sleeve member 48 secured to annular sheet metal member 24 and extended into the chamber 30. The clutch housing 20 also has an annular wall member 50 positioned on a hub portion 52 by a retainer ring assembly 54. The hub portion 52 may be secured to or formed integrally with annular member 24. The annular member 24 has an axially extending wall portion 56 which slidably supports the apply piston 34. A pair of annular lip seals 58 and 60 are disposed in respective grooves on apply piston 34 and cooperate with sleeve 48 and wall portion 56 to establish the diametral limits of an apply chamber 62 formed between annular member 24 and apply piston 34.

The annular wall member 50 has disposed thereon an annular lip seal 64 which sealingly engages the apply piston 34 and cooperates with seal 58 to establish the diametral limits of a feed chamber 66. The apply piston 34 has an annular face 68 adapted to frictionally engage annular friction surface 40 such that during clutch engagement, annular friction surface 38 will frictionally engage annular member 26 resulting in rotation of plate 36 and therefor clutch output shaft 46. The apply piston 34 is guided axially in the clutch housing 20 by pins, not shown, which are secured to sheet metal member 24. These pins provide a rotary drive connection between the clutch housing 20 and the apply piston 34.

Figure 2:
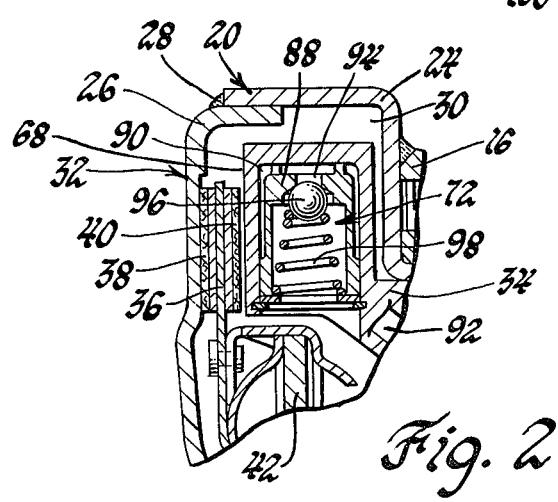
FIG. 2 is a sectional view showing a portion of the clutch of FIG. 1 angularly displaced from the view of FIG. 1.

The apply piston 34, as seen in FIG. 1, houses a valve member 70 and, as seen in FIG. 2, also houses a valve member 72. These valve members 70 and 72 may be singular, as shown, or can have an identical mate disposed diametrically opposite. If the valves 70 and 72 do not have a mate disposed diametrically opposite, it will be necessary to provide weights to ensure dynamic balance.

The valve 70 includes a valve housing 74 having an opening 76 which is closed by a ball 78. The ball 78 rests in a ball seat or centrifugal weight 80 which is operated on by a spring 82 in a direction urging the ball 78 to close opening 76. The valve housing 74 is disposed in a cylindrical chamber 84 which is in fluid communication through a passage 86 with the clutch apply chamber 62.

The valve 72 includes a housing 88 disposed in a cylindrical chamber 90 formed in apply piston 34 and also in fluid communication with the apply chamber 62 through a fluid passage 92. The valve housing 88 has disposed therein an opening 94 in fluid communication with the chamber 90 and adapted to be closed by a ball member 96 which is urged into closing relationship with opening 94 by a spring 98.

The radially inner portions of valves 70 and 72 are in fluid communication with the chamber 30 which is connected to an exhaust passage, not shown, in a conventional manner. The feed chamber 66 is supplied with pressurized fluid through a fluid passage 100 which is supplied by a conventional hydraulic pump 102. The fluid in feed chamber 66 is communicated through a restricted passage or orifice 106 to the apply chamber 62.

The pressure level in passage 100 is established by a conventional variable regulator valve 104. The pressure level established by the regulator valve 104 can be controlled by any of the well-known transmission pressure controls which are responsive to engine torque, vehicle speed, transmission ratio or other engine or vehicle operating parameters. The pressure level may be controlled, for example, to be responsive to engine operating temperature.

Figure 4:
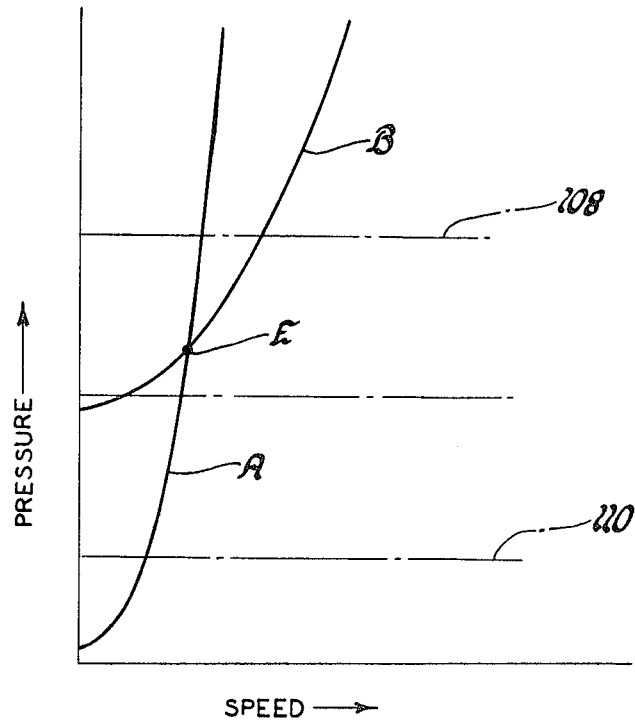
FIG. 4 is a graph depicting the pressure and speed relationships of the exhaust control valves shown in FIG. 1.

The valves 70 and 72 are centrifugally sensitive or responsive valves. That is, as the speed of rotation increases, the closing force of each valve also increases. The closing force of valve 70, due to the large mass of ball seat 80 increases incrementally more rapidly than valve member 72. This is shown in FIG. 4 in that curve A has a more rapidly increasing pressure-speed relationship than does curve B. Curve A represents the pressure required to open valve 70 at any given speed level while curve B represents the pressure-speed relationship to open valve 72. The pressure level established by valves 70 or 72 is, of course, the pressure level found in the apply chamber 62. Thus, the clutch apply pressure is determined by the valves 70 and 72. Therefore, as clutch input speed increases, clutch apply pressure will increase.

The fluid pressure in feed chamber 66 operates on the effective area determined by seals 58 and 64, as previously mentioned, to urge disengagement of the apply piston 34. Therefore, the clutch apply force is equal to the pressure in the apply chamber times the apply chamber area minus the pressure in the feed chamber times the feed chamber area minus the effective area of the lube pressure found in annular space 30 which operates on an unbalanced area of apply piston 34 as will be apparent to those skilled in the art. Since the pressure in feed chamber 66 is substantially constant for a given operating condition and the pressure in apply chamber 62 is responsive to engine speed, the apply force will increase as engine speed increases such that clutch engagement will occur at some predetermined engine speed.

Figure 3:
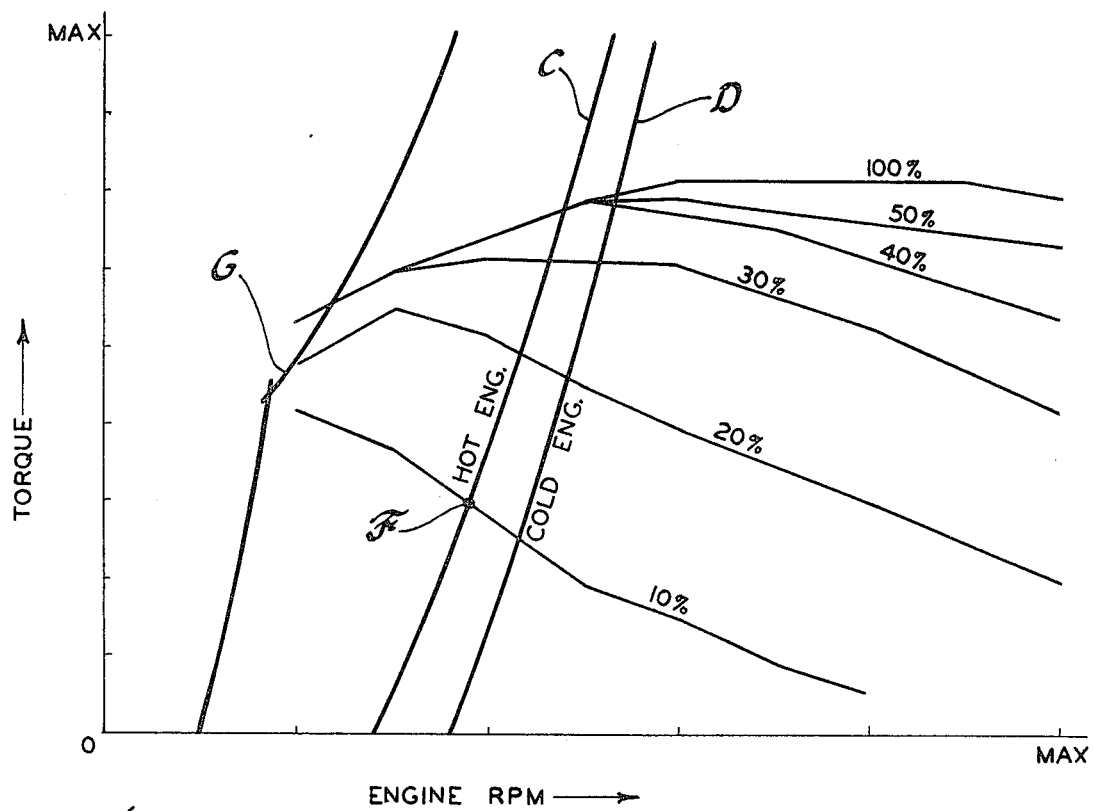
FIG. 3 is a graph depicting characteristics of the clutch and a prime mover.

Looking at FIG. 3, and assuming that the pressure in feed chamber 66 is at a level consistent with line 108 of FIG. 4, the clutch apply force or clutch torque capacity will follow along curve C which represents the engaging function desired when the engine is operating at its normal temperature. Curve D represents the engine operating characteristic desired when the engine is cold. This curve is established by increasing the level of pressure in feed chamber 66 slightly.

It should be noted that valve 70 is inoperative from a control standpoint since the initial clutch application pressure is above the crossing point E of curves A and B as shown in FIG. 4. The curve marked 10% through 100% in FIG. 3 represents engine torque output for these respective percentages of throttle opening. For example, at 10% throttle, the capacity of the clutch is equal to engine torque output at point F. If the clutch capacity is below this point and engine throttle is set at 10%, the clutch will slip. If clutch capacity is above this point, the clutch will not slip at 10% throttle. It will be obvious to those skilled in the art that the torque capacity must increase as engine throttle percentages increase.

It is often desirable after the vehicle is moving to permit coasting with the clutch engaged or vehicle operation at low throttle settings without the clutch slipping. To obtain this function, the pressure level established by regulator 104 is set at level 110 as seen in FIG. 4. Reducing the pressure level in feed chamber 66 has the effect of moving the clutch torque capacity curve C upward in FIG. 3 such that curve G will be the operating characteristic curve. It will be apparent from viewing curve G that both valves 70 and 72 are operable to control clutch capacity depending upon the engine operating speed. Thus, it is possible to operate the vehicle at road load conditions without clutch slippage occurring. The advantages of this will be readily apparent in that it will be possible to provide a slipping clutch function for smooth vehicle acceleration and a completely engaged clutch for normal vehicle operation.

By controlling the pressure level in the feed chamber 66, it is obvious that various torque capacity-engine speed relationship levels can be achieved such that the clutch can be tailored to a specific engine or vehicle.

This input clutch can be utilized with many different types of transmissions such as the planetary gear type, continuously variable friction belt type or automatically shifted synchromesh type transmissions. This particular invention can be used wherever a slipping type input clutch is usable.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A fluid pressure centrifugally sensitive clutch comprising; a friction clutch; a housing; a differential area apply piston slidably disposed in said housing and cooperating therewith to form a feed chamber and an apply chamber having an effective area greater than the effective area of said feed chamber; fluid source means for supplying fluid at selective pressure levels to said feed chamber; restrictive flow passage means connecting said feed chamber to said apply chamber; first centrifugally responsive valve means for controlling exhausting of fluid from said apply chamber to establish a static pressure level in said apply chamber determined by a first speed-pressure relationship which is equal to or less than the pressure level in said feed chamber for urging clutch application; and second centrifugally responsive valve means for controlling the exhaust of fluid from said apply chamber to establish a static pressure level in said apply chamber equal to or less than the pressure level in said feed chamber as determined by a second predetermined speed-pressure relationship in said apply chamber for urging engagement of said clutch, said second centrifugally responsive valve means being opened at higher initial pressure and having a less rapidly increasing speed-pressure relationship than said first centrifugally responsive valve, fluid pressure in said feed chamber being operable to urge disengagement of said clutch and being effective to establish the required engagement pressure for said clutch in accordance with the pressure level of the fluid source.

2. A fluid pressure centrifugally sensitive clutch having an input speed comprising; a friction clutch; a housing; a differential area apply piston slidably disposed in said housing and cooperating therewith to form a feed chamber and an apply chamber having an effective area greater than the effective area of said feed chamber; fluid source means for supplying fluid to said feed chamber; restrictive flow passage means connecting said feed chamber to said apply chamber; centrifugally responsive valve means for controlling exhausting of fluid from said apply chamber to establish a static pressure level in said apply chamber determined by a first speed-pressure relationship which is equal to or less than the pressure level in said feed chamber for urging clutch application as a function of input speed; and means for charging the pressure level of the fluid source so that said centrifugally responsive valve means will be effective to control the exhaust of fluid from said apply chamber to establish a static pressure level in said apply chamber equal to or less than the pressure level in said feed chamber as determined by a second speed-pressure relationship in said apply chamber for urging engagement of said clutch, said second pressure level causing said centrifugally responsive valve means to be opened at higher initial pressure and having a less rapidly increasing speed-pressure relationship than said first centrifugally responsive valve thus providing a starting clutch function, fluid pressure in said feed chamber being operable to urge disengagement of said clutch and being effective to establish the required engagement pressure for said clutch in accordance with the pressure level of the fluid source.

3. A fluid pressure centrifugally sensitive clutch comprising; a friction clutch; a housing; a differential area apply piston slidably disposed in said housing and cooperating therewith to form a feed chamber and an apply chamber; fluid source means for supplying fluid at selective pressure levels to said feed chamber; restrictive flow passage means connecting said feed chamber to said apply chamber; first centrifugally responsive valve means for controlling the exhaust of fluid from said apply chamber to establish a first predetermined speed-pressure relationship in said apply chamber for urging clutch application; and second centrifugally responsive valve means for controlling exhausting of fluid from said apply chamber to establish a second predetermined speed-pressure relationship in said apply chamber for urging engagement of said clutch, said second centrifugally responsive valve means being opened at higher initial pressure and having a less rapidly increasing speed-pressure relationship than said first centrifugally responsive valve, fluid pressure in said feed chamber being operable to urge disengagement of said clutch and being effective to establish the required engagement pressure for said clutch in accordance with the pressure level of the fluid source.

* * * * *